INVENTORS:
FRANCIS E. FISH
DENNIS F. COOPER

Dec. 30, 1969  F. E. FISH ET AL  3,486,957
METHOD AND APPARATUS FOR CUTTING AND EDGE-SEALING
THERMOPLASTIC WOVEN FABRICS
Filed May 12, 1966  2 Sheets-Sheet 2
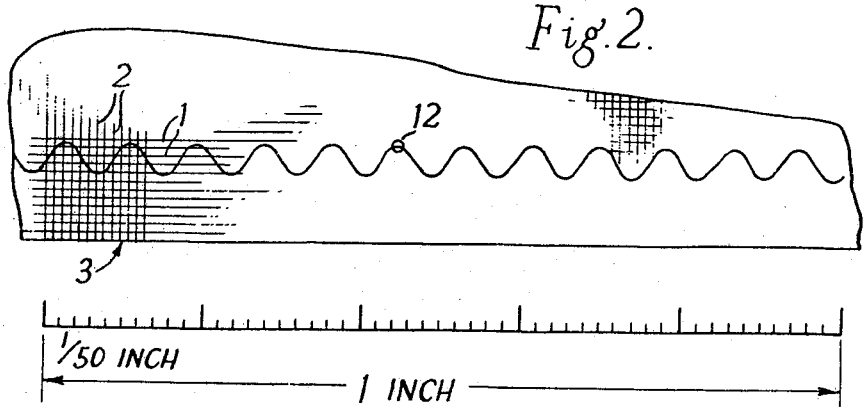
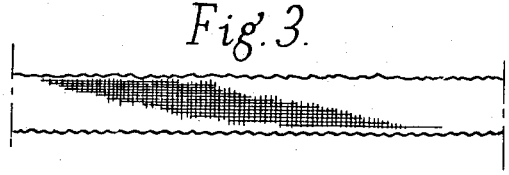
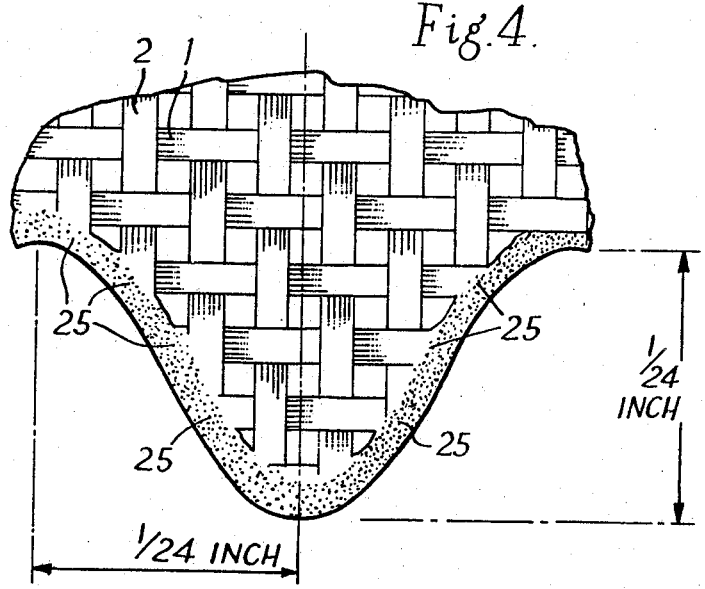
INVENTORS:
FRANCIS E. FISH
DENNIS F. COOPER United States Patent Office 3,486,957
Patented Dec. 30, 1969

3,486,957
METHOD AND APPARATUS FOR CUTTING AND EDGE-SEALING THERMOPLASTIC WOVEN FABRICS
Francis Edwin Fish, 77 Mulgrave Road, and Dennis Frederick Cooper, 118 Carshalton Road, both of Sutton, Surrey, England
Filed May 12, 1966, Ser. No. 557,331
Int. Cl. D03d 47/50; D06c 25/00; B32b 31/00
U.S. Cl. 156—88                                    5 Claims

ABSTRACT OF THE DISCLOSURE

The invention provides a method, for cutting fabric woven with thermoplastic threads, in which relative movement is effected longitudinally of the fabric between the fabric and a cutter element heated to a thread-fusing temperature, and in which there is simultaneous relative movement transversely of the fabric between the fabric and the cutter element, the longitudinal and transverse movements being selected such that the cutter produces in the fabric a waved cut edge having at least half of its adjacent warp and weft threads fused together at their cut ends. The frequency and amplitude of the transverse movement, in relation to the rate of longitudinal movement, is such that the length and depth of each half wave are both not more than about ten times and not less than about three times the mean diameter of the warp and weft threads.

This invention relates to the edge-sealing of thermoplastic woven fabrics, such as nylon. It is primarily concerned with the treatment of such fabrics which consist entirely of thermoplastic threads, i.e., have both their warp and weft threads consisting solely of such material.

It is already known, in the art of splitting thermoplastic woven fabric, e.g., into strips or ribbons, and in the art of providing a selvedge on such material, to impart to the raw edge of the material a scalloped formation which is intended mainly to serve as a decorative effect but which in some instances may also have a reinforcing effect for the raw portion, similar to that obtained with pinking.

In the known methods of obtaining such scalloped edge effects it has been usual hitherto to use either heated cutter wheels having a suitably waved contour, or so-called "hot wire" cutters. As an accidental result of the use of a heated tool, there has been some tendency to produce, in the scalloping, a secondary action of sealing together a proportion of the severed warp and weft threads where they happen to cross at the extreme edge of the cut.

In the scalloping which has been carried out hitherto, the waved edge line which has been produced has been of comparatively shallow depth, i.e., indentation from crest to trough, as compared with the wave-length. For example, the maximum number of scallop waves per inch of material which has been used hitherto has been of the order of three or four to the inch, each half wave traversing a large number of both warp and weft threads.

As a result, although there was a certain amount of sealing together of severed threads, and although the edge was scalloped and accordingly strengthened by the known effect of pinking, the scalloping used hitherto has not resulted in any great relative increase in the "sealed length" of the edge, nor in the strength of the edge portion of the cloth, and any increased resistance to breaking away of warp threads has been a small secondary effect incidental to the pinking.

It is the main object of the present invention to provide an improved method of treatment of the edge of thermoplastic woven fabrics whereby, as a major result, there is obtained a relatively very much increased "sealed length" of the edge, improving the strength and resistance of the edge to breaking away of threads therefrom. As a secondary result, the fabric has imparted to it a selvedge which is also somewhat decorative.

According to the present invention, a method for the edge treatment of thermoplastic woven fabric includes the steps of:

(i) Effecting relative movement, longitudinally of the fabric, between the fabric and a cutter element at a suitable temperature to cut the threads and seal adjacent threads together;

(ii) Simultaneously effecting relative movement, transversely of the fabric, between the fabric and the cutter element so as to produce a waved out edge having at least the major proportion of its adjacent warp and weft threads heat-sealed together.

The frequency and amplitude of the transverse relative movement being selected, in relation to the rate of longitudinal movement, such that the length and depth of each half wave are both not more than about ten times and not less than about three times the diameter of the warp and weft threads (or the mean of their diameters, if they are of different diameters).

By the choice of these dimensions, whilst substantially every crossed pair of warp and weft threads severed by the cutter is also heat-sealed together, there is also imparted to the fabric a relatively very much lengthened (and fully heat-sealed) edge which nevertheless does not have the crests of the wave formation extending relatively far out from the fabric and thus avoids parting of the threads and "tearing-out" of the warp at the extreme edge. In effect, there is obtained a waved edge in which all these threads occurring in the outwardly projecting areas are heat-sealed together and over relatively very short intervals.

The minimum length and depth of each half wave is in practice dictated by considerations of obtaining rapid enough relative movement of the fabric and the cutter element whilst still resulting in both cutting and heat-sealing; the maximum length and depth of each half wave is not fixed by such practical limitations, but to obtain the benefit of the present invention would be in all cases a number of times smaller than the smallest scalloping which has been effected hitherto.

As a practical example, in a nylon fabric having about one hundred threads to the inch, in both warp and weft, a wave form of approximately equal length and amplitude was imparted to the edge at the rate of about twelve crests per inch, the length and amplitude of each half wave corresponding to the diameter of about four threads.

Such a method may be utilised to form a selvedge on a sheet or ribbon fabric, or may be utilised as part of a method of splitting a wider sheet of fabric into a plurality of sheets or ribbons, and simultaneously applying a selvedge to each cut portion.

The wave formation is not necessarily a sine wave, but is preferably made so because it is in general most convenient to obtain a simple harmonic motion in the relative transverse movement of the fabric and the cutter element.

For practical reasons it is most convenient to move the fabric in a constant-speed movement past the cutter element, so far as concerns the longitudinal movement between the two. Similarly, it is most convenient to move the cutter element relative to the fabric, so far as concerns the relative transverse movement between the two.

Thus, in a preferred arrangement, the fabric is traversed steadily past the cutter element in the longitudinal direction of the fabric, and the cutter element is reciprocated normally to the edge of the fabric.

Although the application of the invention is not restricted thereto, it is convenient to use as the cutter element a heated wire which is disposed normally to the plane of the fabric at the cutting areas. Such a wire may then serve, as well known in the art, to sever a strip from a main sheet of fabric, thereby simultaneously producing two complementary sealed cut edges on neighbouring portions. If a plurality of such wires are arranged as a grid disposed transversely to the sheet of fabric, they will serve for the simultaneous splitting of the sheet of fabric into a plurality of strips, each strip (other than those at the edges of the sheet) having both its edges simultaneously heat-sealed with the very small wave formation of the present invention.

Due to the relatively very rapid movement of the cutter element, with respect to the fabric to be treated, it is found preferable to have the working surface of the cutter element generally rounded, and of comparable dimensions to the size of the wave to be cut, the wire having a width or diameter of, say, about half the total wave amplitude.

It is also found that, due to the relatively rapid movement of the fabric past the cutter element, the latter may be and is preferably heated to a considerably higher temperature than has been used hitherto in, for example, the cutting of the conventional scallops, wherein the relatively prolonged contact between such a hotter cutter wire and the fabric would have resulted in heat damage to the edge of the material.

In order that the nature of the invention may be readily ascertained, an embodiment of apparatus and its method of operation in accordance therewith are hereinafter particularly described with reference to the figures of the accompanying drawings, wherein:

FIG. 2 is a plan view of a portion of woven material showing the nature and dimensions of the wave-like edge formed;

FIG. 3 is a plan view, to a much smaller scale, of a portion of tape or ribbon having both edges treated in accordance with the invention;

FIG. 4 is a plan view, to a very much enlarged scale, of a single half-wave formed on the edge of the material, to indicate the dimensions and the manner of sealing of the thread ends.

Figure 1:
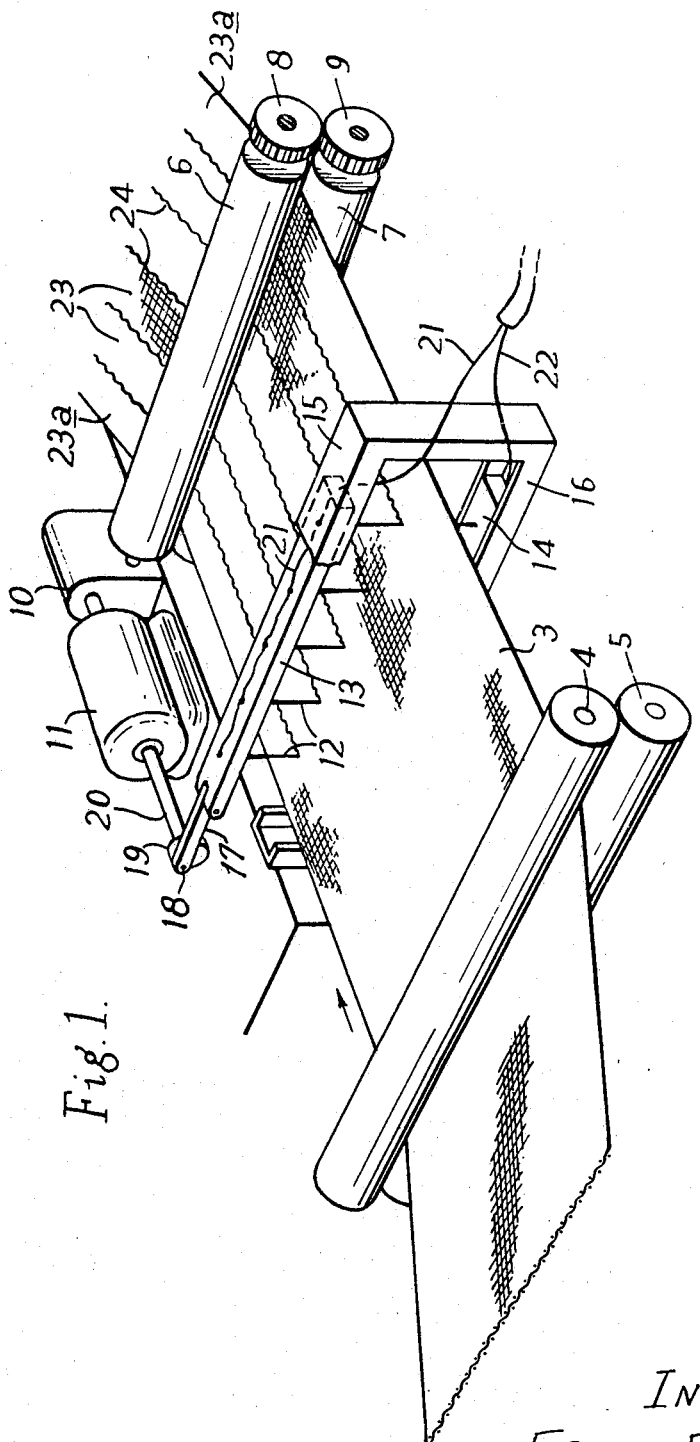
FIG. 1 is a schematic perspective view of an apparatus for carrying out the method of the invention.

The woven thermoplastic fabric to be treated is composed entirely of nylon warp threads 1 and nylon weft threads 2, as best seen in FIG. 4, arranged in a simple weave at right angles, the warp and weft threads being of the same diameter and there being about one hundred threads to the inch of both warp and weft.

A sheet 3 of fabric, of a width which is a multiple of the width of the strips to be formed, is fed through feed rollers 4, 5 in the direction of the arrow in FIG. 1 to a device which simultaneously cuts the sheet into strips and effects a waved sealing formation at the edges of the cut strips, with the exception of the outer edges of the two outermost strips already having a selvedge.

To keep the material suitably taut, and to permit accurate control of the rate of feed, the material is drawn through the apparatus by a pair of coacting drive rollers 6, 7 coupled by meshed pinions, 8, 9 and driven at a suitably slow speed through a reduction gear box 10 by an electric motor 11.

The cutting means consists of a set of parallel wires 12 of circular cross-section secured in an upper frame 13 and a lower frame 14 and held tautly in a position normal to the plane of the fabric 3. The set of wires are spaced at equal intervals transversely to the sheet 3 of fabric. The two frames 13 and 14 are rigidly coupled for carrying out equal movements in respective channel guides 15 and 16 disposed transversely with respect to the direction of movement of the fabric.

At one end the pair of frames 13 and 14 is coupled by a pivot to one end of a link 17, the other end of the link being coupled to an eccentric pin 18 on a pinion 19 mounted on a relatively high-speed shaft 20 of the electric motor 11. This arrangement imparts a rapid simple harmonic reciprocating motion to the set of wires 12.

The wires are each connected by common conductors 21, 22 to a source of electric current (not shown), by which they are brought to a suitable temperature for cutting the thermoplastic material at the relative speed utilised.

The rate of reciprocation of the wires and the rate of travel of the fabric are arranged so that the heated wires impart to the cut edges a wave formation of about twelve crests per inch, as seen in FIG. 2. The diameter of the heated wires 12 is about one-fiftieth of an inch. As a practical example, it has been found possible to feed the fabric 3 along at a rate of one and one-fifth of an inch per second, and to reciprocate the wires at a rate of about fifteen times per second, giving a wave count of twelve crests per inch.

The resultant strips 23, each separated from its neighbours by waved cuts 24 with the exception of the extreme outer strips 23a already provided with selvedges at their outer edges, have both of their cut edges waved and heatsealed. Referring to FIG. 4, the length and depth of each half-wave each include about four warp threads 1 and about four weft threads 2, and all or substantially all of these threads are heat-sealed to the adjacent and to the crossing threads along the line of cut, as at 25. The edges thus formed are extremely resistant to fraying, and major force must be applied to cause a warp thread 1 to break away.

We claim:
1. A method for the cutting of fabric woven from thermoplastic warp and weft threads which comprises the steps of:
(i) effecting a first relative movement, longitudinally of the fabric, between the fabric and a cutter element;
(ii) simultaneously effecting a second relative movement, transversely of the fabric, between the fabric and said cutter element, said cutter element being heated to a temperature at which it melts the threads so that they become parted along the line constituting the resultant of said first and second relative movements and thread ends thereby created are fused together along each side of said line, said longitudinal and said transverse relative movements being selected each in relation to the other such that the cutter element produces in the woven fabric a waved cut edge having at least half of its adjacent warp and weft threads fused together at their cut ends, and the frequency and amplitude of said transverse relative movement being selected, in relation to the rate of said longitudinal movement, such that the length and depth of each half wave are both not more than about ten times and not less than about three times the mean diameter of the warp and weft threads.

2. The method claimed in claim 1 wherein the length and depth of each half wave are each about four times the mean diameter of the warp and weft threads.

3. The method claimed in claim 1 wherein, for splitting said woven fabric into a plurality of strips, said first and second relative movements are effected between said fabric and a plurality of said cutter elements spaced transversely of said fabric.

4. Apparatus, for the cutting of fabric woven from thermoplastic warp and weft threads, comprising at least one cutter element heated to a temperature for melting the threads to cause them to part and to fuse parted thread ends together, means for effecting a first relative movement of said cutter element longitudinally with respect to said fabric, and means for simultaneously effecting a second relative movement of said cutter element transversely with respect to said fabric, said means for effective relative longitudinal movement and said means for effecting relative transverse movement being operable such that said cutter element describes a wave motion in which the length and depth of each half wave are both not more than about ten times and not less than about three times the mean diameter of the warp and weft threads of said fabric.

5. Apparatus, as claimed in claim 4, comprising a plurality of said cutter elements spaced transversely of said fabric and coupled for movement in unison.

References Cited

UNITED STATES PATENTS

| | | | |
|---|---|---|---|
| 2,026,754 | 1/1936 | Stafford | 83—428 XR |
| 2,623,586 | 12/1952 | Volpi | 83—171 |

FOREIGN PATENTS

| | | |
|---|---|---|
| 805,836 | 12/1958 | Great Britain. |
| 573,409 | 2/1958 | Italy. |

PHILIP DIER, Primary Examiner

U.S. Cl. X.R.

83—171, 428; 156—251, 271, 515; 242—56.7